Patented Nov. 1, 1949

2,486,664

UNITED STATES PATENT OFFICE 2,486,664

RUSTPROOF COATING OF FERROUS METALS

Paul E. Marling and John E. Malowan, Dayton, Ohio, assignors to Monsanto Chemical Company, St. Louis, Mo., a corporation of Delaware No Drawing. Application March 17, 1945, Serial No. 583,392

7 Claims. (Cl. 148—6.15)

The present invention relates to rust-proofing compositions and more particularly to rust-proofing compositions which may serve as a primer coating for ferrous and other metal surfaces and to a method for utilizing the same.

An object of the present invention is the provision of a liquid organic film forming composition containing as a pigment, finely divided red phosphorus dispersed therein. Another object is the provision of a method for protecting steel against corrosion.

Heretofore in the rust-proofing of iron or steel surfaces it has been customary to first treat the metal with phosphoric acid or a phosphate in admixture, if desired, with compounds of chromium, manganese, etc. This treatment provides a thin film upon the metal, which film serves to prevent substantial oxidation of the metal. In finishing the metal so treated there is applied first a primer coating which serves to provide for adhesion between the metal and the subsequent coating of paint or enamel.

Now we have found that it is possible to eliminate one of the three steps outlined above, i. e., the rust-proofing, priming and final finishing, by employing the invention hereinafter described. According to the present invention, we apply to the clean metal a film-forming coating which contains red, elemental phosphorus as a rust-proofing pigment, allow the coated product to dry and then apply an additional coat or coats of paint, enamel or lacquer. We have found that film-forming compositions containing red, elemental phosphorus as pigment serve not only as rust-proofing materials, but also as primers in the finishing of iron, steel or other metal surfaces.

Film-forming compositions containing red, elemental phosphorus, when applied to iron or steel, dry to yield well-adherent, flexible, red films which not only serve as a primer coating for the metal to which they have been applied, but also prevent corrosion of the metal. Such protective, anti-corrosive effect is noticeable even after the film has been removed, for example, by scratching or attrition; hence, the anti-corrosive property of the phosphorus-containing film is due not merely to exclusion of oxygen and other corroding agents by the organic film, but also to a rust-inhibitory effect imparted to the steel.

The film-forming compositions which we may employ in the preparation of our new rust-proofing and priming coatings may be any film-forming, drying or semi-drying oil, a mixture of such an oil and a natural or synthetic resin, or a solution of a resin in a volatile solvent. The red phosphorus, in a finely divided form, is thoroughly mixed, at ordinary or increased temperatures, with one or more of such vehicles and thoroughly homogenized therewith, for example, by mechanical agitation. The red phosphorus, from the manner in which it is dispersed and held in the film-forming composition, may be considered simply as a pigment, yielding to the coating a red color of very good covering power. It thus resembles such pigments as iron oxide or red lead. However, the red phosphorus pigment differs from these prior known pigments in possessing not only the desired coloring and occluding properties, but also an electrochemical affinity for the metal base whereby there is formed a union between base and pigment which exerts a pronounced anti-corrosion protection effect. While we do not understand the exact reasons for the protective action, we have found that this anti-oxidant effect is maintained even after mechanical removal of the phosphorus containing organic film, as will be hereinafter described.

The red phosphorus which we employ is substantially free of yellow phosphorus and of oxygen-containing compounds of phosphorus such as phosphorous acid. While various methods are known for the preparation of substantially pure red phosphorus, we have found the following procedure to be very advantageous. Since commercial amorphous red phosphorus may contain some white or yellow phosphorus, it is heated in the absence of air to a temperature of, say, from 300° C. to 345° C. in order to change any yellow phosphorus which may be present into the red modification. The period of heating depends upon the quantity of yellow phosphorus which may be present; however, for most commercial grades of red phosphorus it may be stated to range from 12 to 24 hours. Following the heating step, the red phosphorus is washed with ethanol in order to remove any last traces of yellow phosphorus and/or phophorous acids. The treated red phosphorus is then allowed to dry, preferably in a vacuum oven, and subsequently comminuted, for example, in a ball mill, to a particle size of from, say, —200 to —325 mesh.

Purification of commercially available red phosphorus to a degree which is suitable for the present purpose may also be carried out by washing the commercial material with dilute caustic soda and extracting the red phosphorus with carbon tetrachloride. Another method which may be employed is that described in Patent No. 2,359,243 in which the red phosphorus is mixed with a solution of sodium aluminate in water, the resulting mixture being aerated for at least several hours and the phosphorus then removed from the solution and dried.

The method of obtaining the substantially pure red phosphorus thus forms no part of the present invention; it is essential, however, that the red phosphorus employed in the present anti-corrosive and priming compositions be substantially free of yellow phosphorus and/or oxygen compounds of phosphorus. Depending upon the method by which the red phosphorus is obtained or purified, it may contain various amounts of other known allotropic modifications of phosphorus, for example, violet phosphorus, scarlet phosphorus or black phosphorus. The presence of these allotropic forms of red phosphorus in our rust-proofing and priming compositions is accordingly not excluded.

The present invention is further illustrated, but not limited, by the following examples:

Example 1

Commercially available red phosphorus was heated at a temperature of 330° C. for 12 hours, extracted with ethanol in order to remove yellow phosphorus and phosphorous acid therefrom, and then dried in a vacuum oven. The dried product was ground in the ball mill until a material passing through a 200 or 325 mesh screen is obtained.

The substantially pure red phosphorus thus obtained was incorporated into a coating composition by mixing together in the cold, 35 parts by weight of the red phosphorus, 35 parts of linseed oil and 3 parts of cobalt-lead drier. When applied to a steel surface, the resulting coating composition air-dried within 24 hours to yield an adherent, smooth, red film. Baking of the coated object at a temperature of 100° C. for 2 hours had no harmful effect on the film. Immersion of the coated object in water at room temperature for a period of 60 days had substantially no effect on either the adhesion or flexibility of the film. A section of the surface from which some of the coating had been removed had not been corroded.

Example 2

A mixture consisting of 15 parts of the purified and ground red phosphorus of Example 1, 35 parts of an alkyd resin (medium oil-oxidizing type), 10 parts of xylene and 3 parts of a cobalt-lead drier was thoroughly homogenized by mechanical agitation at room temperature. Upon applying the resulting coating to a clean, steel panel, it air-dried within 3 hours to yield an adherent red film which remained flexible, red and adherent after the coated panel had been baked for one hour at a temperature of 250° F. Roof exposure tests made on the treated panel in Dayton, Ohio, showed substantially no change in the film at the end of four months.

Example 3

A mixture consisting of 10 g. of polystyrene, 90 g. of xylene and 100 g. of the purified and ground red phosphorus of Example 1 was homogenized at room temperature. When the resulting product was applied to a sheet iron test panel, it air-dried in 30 minutes to yield a strongly adherent, flexible, smooth, red film.

Example 4

A mixture consisting of 25% of an alkyd resin solid, known to the trade as G. E. 2466, 50% of a chlorinated rubber solid such as Parlon (10 CPS) and 25% of the purified and ground red phosphorus prepared as described in Example 1 was thoroughly homogenized by stirring at room temperature. The resulting composition air-dried within 1 hour when applied to a steel test panel to yield a well-adherent, red film of good flexibility and prevented the corrosion of the metal when immersed in water for 2 months.

Because weathering tests have shown that after long exposure, films of the present phosphorus-containing compositions become somewhat discolored, although its protective power is not impaired, our new coating compositions are recommended particularly as priming materials. For this purpose they are admirably suited, forming a tough, tenacious bond between the base metal and the finishing coat and exerting at the same time a definite inhibitive effect against corrosion. The finishing materials which may be employed with our primers comprise either the air-drying or baking type of finishes; for as has been heretofore disclosed, films of the present coatings are not adversely affected when submitted to temperatures that are ordinarily employed in the production of baked finishes.

The content of red phosphorus in the priming compositions may be varied within wide limits, for example, from 1% to 90%, based on the total weight of the coating composition, and depending upon the degree of covering power desired. For obtaining optimum inhibiting and good coverage, however, we prefer to use the red phosphorus in amounts of, say, at least 25% by weight of the coating.

As may be apparent to those skilled in the art, prior known pigments may be used in admixture with the red phosphorus in formulating anti-corrosive primer coatings. With the red phosphorus there may be present, for example, such pigments as iron oxide, red lead, litharge, zinc chromate, etc.

Other modes of applying the principle of our invention may be employed instead of those explained, change being made as regards the methods herein disclosed, provided no departure is made from the appended claims.

What we claim is:

1. The process for protecting iron or steel against corrosion which comprises applying to surfaces thereof a film composed of a liquid, resinous film-forming drying oil carrying, as a pigment therein, finely divided red phosphorus substantially devoid of yellow phosphorus and oxygen compounds of phosphorus and then heating said surfaces to dry and solidify said film.

2. A liquid film-forming coating composition composed of a resinous, film-forming liquid and as a pigment finely divided red phosphorus dispersed therein, said red phosphorus being substantially free from yellow phosphorus and oxygen compounds of phosphorus.

3. A coating composition composed of a film-forming drying oil and as a pigment finely divided red phosphorus dispersed therein, said red phosphorus being substantially free from yellow phosphorus and oxygen compounds of phosphorus.

4. A coating composition composed of a film-forming drying oil, a resin soluble therein and, as a pigment, finely divided red phosphorus dispersed therein, said red phosphorus being substantially free from yellow phosphorus and oxygen compounds of phosphorus.

5. A coating composition composed of a resinous film-forming liquid, an alkyd resin soluble therein and, as a pigment, finely divided red phosphorus dispersed therein, said red phosphorus being substantially devoid of yellow phosphorus and oxygen compounds of phosphorus.

6. A coating composition composed of a film-forming drying oil, an alkyd resin soluble therein and, as a pigment, finely divided red phosphorus dispersed therein, said red phosphorus being substantially devoid of yellow phosphorus and oxygen compounds of phosphorus.

7. The process for protecting steel against corrosion comprising applying to surfaces thereof a liquid, resinous, film-forming, pigment-containing composition, the said pigment consisting essentially of finely divided red phosphorus, the said red phosphorus being substantially devoid of yellow phosphorus and oxygen compounds of phosphorus, and drying the said composition.

PAUL E. MARLING.
JOHN E. MALOWAN.

REFERENCES CITED

The following references are of record in the file of this patent:

UNITED STATES PATENTS

| Number | Name | Date |
|---|---|---|
| 1,428,085 | Gravell | Sept. 5, 1922 |
| 1,764,604 | Brunhubner | June 17, 1930 |
| 1,995,954 | Albrecht | Mar. 16, 1935 |
| 2,282,163 | Burgwin | May 5, 1942 |

OTHER REFERENCES

Chemical Abstracts, vol. 26 (1932), page 4469.
Chemical Abstracts, vol. 30 (1936), pages 4029 and 5558.